United States Patent [19]

Courty

[11] 3,846,341

[45] Nov. 5, 1974

[54] PROCESS FOR MANUFACTURING IRON MOLYBDATE CATALYSTS OF HIGH STRENGTH AND THE USE OF THE RESULTING CATALYSTS IN THE CATALYTIC OXIDATION OF ALCOHOLS TO ALDEHYDES

[75] Inventor: Philippe Courty, Nanterre, (Hauts de Seine), France

[73] Assignee: Institut Francais du Petrole, des Carburants et Lubrifiants, Rueit Malmaison, France

[22] Filed: Mar. 8, 1971

[21] Appl. No.: 122,075

[30] Foreign Application Priority Data
Mar. 16, 1970  France .............................. 70.09373

[52] U.S. Cl.............. 252/462, 252/443, 252/455 R, 252/458, 252/463, 252/464, 252/465, 252/466 J, 252/470, 252/471, 260/603 R
[51] Int. Cl...... B01j 11/22, B01j 11/34, B01j 11/36
[58] Field of Search ............ 252/470, 462; 260/603, 260/606

[56] References Cited
UNITED STATES PATENTS

| | | | |
|---|---|---|---|
| 3,194,771 | 7/1965 | Vasseur et al. ...................... | 252/470 |
| 3,403,112 | 9/1968 | Sze et al. ............................. | 252/470 |
| 3,408,309 | 10/1968 | Gessner ............................... | 252/470 |
| 3,420,783 | 1/1969 | Bergstrand .......................... | 252/470 |
| 3,467,716 | 9/1969 | Kiff et al............................. | 252/470 |

FOREIGN PATENTS OR APPLICATIONS

| | | | |
|---|---|---|---|
| 1,035,571 | 9/1968 | U.S.S.R............................... | 252/470 |

Primary Examiner—Daniel E. Wyman
Assistant Examiner—P. E. Konopka
Attorney, Agent, or Firm—Millen, Raptes & White

[57] ABSTRACT

An iron molybdate catalyst is manufactured from a precursor containing molybdate, ferric and ammonium ions. The precursor is heated up to 150–250°C and thereafter admixed with water, shaped and dried. It may be activated by further heating. This catalyst which may contain minor amounts of additional metals may be used in the oxidation of methanol to formaldehyde.

20 Claims, No Drawings

PROCESS FOR MANUFACTURING IRON MOLYBDATE CATALYSTS OF HIGH STRENGTH AND THE USE OF THE RESULTING CATALYSTS IN THE CATALYTIC OXIDATION OF ALCOHOLS TO ALDEHYDES

This invention relates to the manufacture of catalysts of the iron molybdate type which may be used in the catalytic oxidation of alcohols to aldehydes, and particularly methanol to formaldehyde.

It relates to an improved process for manufacturing catalysts of the iron molybdate type which have an improved mechanical strength.

It also relates to the unactivated and the activated catalysts obtained thereby.

The general process of this invention comprises the following steps: a catalyst precursor such as defined hereafter is heated under determined conditions. The resulting material is admixed with a liquid. The resulting paste, after optional ageing, is shaped and dried once more. These steps result in an unactivated catalyst of high mechanical strength. When decomposed by heat, for example under the conditions of the oxidation reaction in which the catalyst is to be used, this catalyst is converted to an activated catalyst which has itself a high mechanical strength.

It is known since the issuance in 1933 of the U.S. Pat. No. 1,913,405 assigned to Bakelite Corporation that the combinations of molybdenum oxides with iron oxides are catalytically active in the oxidation of alcohols to aldehydes. These catalysts, known as "iron molybdates" since the main active element in this type of catalysis is ferric molybdate of formula $Fe_2(MoO_4)_3$, are mainly obtained by reacting a ferric salt with a molybdate in solution. The reaction results in a precipitate of the approximate formula $Fe_2O_3, 3$ to $4 MoO_3, x H_2O$ in which $x$ is lower than 10, together with a precipitate of molybdenum trioxide hydrate. The atomic ratio of Mo to Fe in the total precipitate is in the range of 1.5 to 4.

Then the precipitate is settled, washed, dried and decomposed by heat, thus resulting in the catalyst.

The applicants have described a process for manufacturing such catalysts in their published Dutch patent application No. 70/13281 or in their U.S. patent application Ser. No. 68,000 filed on the 28th of August 1970 now Pat. No. 3,716,497 issued Feb. 13, 1973. In this process, the precipitate obtained by reacting the solutions is washed and malaxated with an ammonium salt, and thereafter dried and decomposed by heating.

The applicants have described other processes for manufacturing catalysts of the iron molybdate type in their published Dutch patent applications No. 69/19550 and 70/01762 or in the applications Ser. No. 888 725, now abandoned, and pending Ser. No. 8063 filed in the USA on the 29th of December 1969 and the 2nd of February 1970: in these processes, either solutions of the reactants are reacted together or these reactants are reacted in the solid state by grinding thereof, under such conditions that homogeneous, solid and transparent gels are intermediately obtained; the latter are dried and heat treated to obtain the final catalysts.

The catalysts obtained by these processes have, as a rule, a high activity, a good selectivity and a fairly good mechanical strength. However the reaction conditions in the plants in which methanol is catalytically oxidized to formaldehyde, particularly in the reactors having a plurality of pipes (strongly exothermic reaction, high flow rates of the gaseous reactants) lead to the formation of fines and to an increase of the pressure loss in the catalyst bed. It is thus necessary to improve the mechanical strength of these catalysts as much as possible.

One object of this invention is a process for manufacturing catalysts which may be applied to various known precursors, particularly those prior described by the applicants. This process results in catalysts which have a far greater mechanical strength than the known catalysts. In an intermediate stage, unactivated catalysts may be recovered, which have an outstanding mechanical strength and can be directly charged into the reactor of an oxidation plant, in which they are transformed to activated catalysts by mere heating. It is thus possible to charge the unactivated catalyst into the reactor of the oxidation unit without any cracking of the grains, and to obtain by heat activation a catalyst bed particularly resistant to the usual abrading and attrition.

The catalyst precursors to which this process applies are, as a rule, compounds containing molybdate, iron and ammonium ions and water.

They may consist of homogeneous, amorphous and transparent gels, manufactured according to the methods described in the said published Dutch patent applications No. 69/19550 and 70/01762, and may have a content of water lower than 10% by weight, particularly when they have been previously dried.

Specifically, these gels may be manufactured:

either by reacting, under stirring, at a temperature lower than 20°C, an aqueous solution of ammonium molybdate at a concentration of 1 to 2.5 gram-atoms of molybdenum per liter, with an aqueous solution of a ferric salt, preferably ferric nitrate, at a concentration higher than 1 gram-atom of iron per liter, the relative amounts of solutions being such that, in their mixture, the atomic ratio of Mo to Fe is in the range of from 1.5 to 5;

or by admixing, for example crushing, the solid reactants, in the optional presence of a small amount of water, at a temperature lower than 150°C, the relative amounts of reactants being such that the atomic ratio of Mo to Fe is in the range of from 1.5 to 5.

Whenever necessary, these gels may be dehydrated at a temperature of from 40 to 150°C, preferably 50 to 90°C.

Their content of water must be lower than 10 % by weight.

When manufacturing these gels, up to 50 % of the ferric ions may be substituted with cobalt, nickel, manganese, chromium, scandium, yttrium and rare earths (atomic numbers from 57 to 71) cations, by using salts of these metals, preferably the nitrates, and up to 50 % of the molybdate ions may be substituted with oxygen-containing anions of chromium, tungsten, manganese, vanadium and uranium, in the form of ammonium chromates, tungstates, manganates, vanadates or uranates.

The resulting gels potentially contain an ammonium salt which is ammonium nitrate when iron and the metals which may substituted to iron are used as nitrates. The ammonium salt represents from 30 to 50 % of the dry weight of the gel.

The process of this invention also applies to catalyst precursors consisting of precipitates manufactured according to the process described by the applicants in their published Dutch patent application No. 70/13281.

In the latter case, the initial precipitate may be obtained by reacting an aqueous solution of a ferric salt with an aqueous solution of a molybdate. After filtration and washing, the precipitate is malaxated with a solution of an ammonium salt, preferably ammonium nitrate, according to the said patent application. The molar proportion of the ammonium salt with respect to iron in the precipitate, expressed as gram-equivalents, is higher than 0.3 and preferably in the range of from 0.5 to 2 moles per gram-equivalent (1 gram-ion $Fe^{3+}=$ 3 gram-equivalents of $Fe^{3+}$).

After the precipitate has been malaxated with this solution, the resulting paste contains, as a rule, from 10 to 30 percent of ammonium salt, with respect to the dry weight of precipitate.

This paste is dried thereafter, for example for at least 6 hours, at a temperature of from 40 to 150°C, particularly from 50 to 90°C, to lower the content of water below 10 % by weight.

The process of the present invention consists, in a first step, of heating a precursor such as hereinbefore defined at a temperature of from 150 to 250°C for a time sufficient to get the elimination of the traces of water and at least one part of the ammonium salt contained therein.

For example the loss of (dry) weight, during this heating step, will be in the range of from 10 to 30 %, although satisfactory results may be obtained in some cases with weight losses higher than 30 % or lower than 10 %.

For example, with gels containing cobalt as additive, it may be advantageous to continue the heating at 150–250°C up to complete elimination of the ammonium salt, and to remix the resulting product with a solution of an ammonium salt, for example by malaxating.

With respect to gels, the partial decomposition may be carried out simultaneously to the prior described dehydration. In that case, the gel obtained by reacting the solutions or the solid salts may be heated directly to a temperature of from 150 to 250°C. The heat decomposition is then carried out up to the weight loss of, for example, 10 to 30 %, with respect to the dry weight of said gel.

In that case, however, the exact proportion of the extracted ammonium salt cannot be controlled easily, so that a prior dehydration, such as described before, is preferred.

At the end of the first step of the process, the obtained product may be carefully ground, preferably till a grain size lower than 250 $\mu$ is obtained. The resulting powder may be used thereafter to manufacture homogeneous pastes by further wetting. Wetting and crushing may also be carried out simultaneously.

In a second step, the particles from the first step or the powder obtained by crushing thereof may be admixed with water or any other solvent chemically inert with respect to the powder (i.e. whose use results in no more than solubilization of the ammonium salts).

During this step, a substantial cooling of the material takes place, for example from an initial temperature of 20°C down to about 5 –12°C, attributable to the dissolution of the ammonium salt.

This step results in a set, well thickened paste, having rheological characteristics similar to those of clay and kaolin admixed with water. A moderate ageing of this paste at various temperatures is sometimes beneficial and improves further its rheological qualities.

When the paste has a convenient consistency, which is recognized easily by the skilled people, the third step follows, which consists of shaping, for example, by extrusion. In that case, several devices may be successfully used, for example the Hutte, Andouart, Alexander-Werke or Rousselle devices. The device is chosen according to the rheological characteristics of the paste, themselves depending not only of the amount of water and the ageing time, but also of the ratio of molybdenum to iron, the nature and the content of the additional metals.

Other techniques may also be used for this shaping: pill-making in the presence of water, or shaping this powder in suspension by the oil-drop method.

Another method consists of manufacturing a suspension of this powder in water or any other solvent, to which binding, dispersing or defloculating agents may be added, for example pre-digested starch, polyglycols, alginic acid, alginates, methyl-cellulose, emulsified paraffin waxes, polyvinyl alcohol, natural gums, for example, arabic gum, Senegal gum, gum adraganth, shellac, gum Damar, carouba gum, in an amount of 1 to 5 %.

This suspension containing for example from 30 to 70 % of dry material is atomized in a conventional atomization drying device such as those employed in the pottery industry. The drying cycle is so adjusted that the powder, when withdrawn, contains from 0.5 to 5 % by weight of water and/or solvent. This technique is particularly convenient when manufacturing catalyst particles to be used in fluidized bed.

The product resulting from shaping according to any of these techniques is then dried in a fourth step in order to the stepwise removal of water and/or solvent contained therein. This drying is carried out, for example, by steps, the initial temperature being room temperature and the final temperature being in the range of from 150 to 250°C. The total time is, for example, 6 to 48 hours.

When the shaping has been carried out with low amounts of water or solvent, for example 5 to 10 % with respect to the weight of anhydrous material, the product may sometimes be dried directly at 150–250°C without cracking or internal stress as would occur with higher contents of water or solvent.

At the end of this fourth step, the unactivated catalyst is obtained: it has a green to yellow-green colour, in the absence of additives, a variable colour when additives are present. Surprisingly this unactivated catalyst, when resulting from heating at more than 175°C, has an X-ray diffraction spectrum close to that of the activated final catalyst. Its mechanical strength is very high since a cylindrical grain of unactivated catalyst of a size of 3.5 × 3.5 mm has an average mechanical resistance to crushing, grain by grain, of about 30 kg, this load resulting in no deformation of the unactivated catalyst grain.

In each case, if it is desired for example to increase the content of ammonium salt of the unactivated catalyst, or even when treating a precipitate, if it is desired to add the ammonium salt only in the second step, the product may be treated before shaping with an aqueous solution of an ammonium salt instead of water. The further operations of shaping and drying are carried out as described before.

During the second step of the process, fines consisting of activated or unactivated catalyst from a prior manufacture step may be added to the partially decomposed precursor. This operation results in a further improvement of the mechanical strength of the catalyst, even when additives are present. The amount of fines thus introduced must not exceed 25 % as determined with respect to the weight of dry catalyst in the treated material. A diluent may also be introduced at this stage, provided it is chemically inert with respect to the catalyst, for example divided silicium carbide, alumina, silica or alumina-silica, the degree of division being rather high: for example the particles should have a size lower than 500 microns.

The catalyst is activated by heating at 300–500°C, preferably at 350–470°C. The unactivated catalyst may be charged directly into an oven at a temperature of from 350 to 470°C, or heating may be progressive from the temperature at which the unactivated catalyst has been manufactured, the temperature being progressively raised up to a value of 350 to 470°C. The same step may be carried out directly in the reactor in which the catalyst will be used. However this decomposition may be worked out in any device permitting sufficient heat exchange.

The heat decomposition may be carried out for a time which depends on the heating system. For example, in an oven with a fixed bed, the time is advantageously selected lower than 6 hours, for example 1 to 5 hours.

In no case the temperature of the product under decomposition will exceed 500°C since excessive roasting temperatures may result in a further deactivation of the catalyst.

In all cases, after heat treatment, the catalyst has a green to yellow-green colour in the absence of additives and a variable colour according to the type and the nature of the additive. Its specific surface, determined by the B.E.T. method, is usually in the range of from 0.5 to 20 $m^2/g^{-1}$. Its mechanical resistance, which depends on the ratio of molybdenum to iron and of the nature and content of additive metals, is very high and usually in the range of 4 to 15 kg, when determined on particles of 3.5 by 3.5 mm under the hereinbefore given conditions.

The catalyst may be diluted with a catalytically inert material having a convenient size. The proportion by volume of the catalyst to the total of the catalyst plus the diluent may be varied from 0.1 to 1. The grain size of the diluent is preferably close to that of the catalyst.

The conventionally used diluents have a variable shape, for example balls, cylinders or rings. They may consist of ceramic materials, alumina, silica, alumina-silica, glass or silicium carbide.

The particles of diluent may be either admixed with the particles of catalyst, or disposed in one or several beds upon, below or inside the catalyst bed.

The diluents, when conveniently placed with respect to the catalyst bed, provide for an improvement in the heat exchange characteristics in the latter. Further, they limit abrasion and attrition of the catalyst bed and limit the losses of pressure through the same.

The oxidation of methanol to formaldehyde is carried out by passing a mixture of vaporized methanol and a gas containing molecular oxygen through the catalyst bed at any pressure, preferably a pressure close to atmospheric. The bed is pre-heated at a temperature of from 250 to 450°C, preferably from 300 to 400°C.

Oxygen may be diluted with nitrogen or any other inert gas, optionally containing such gases as steam or carbon dioxide. The proportions of inert gas and oxygen may be selected at will; however thay are selected mainly to avoid any explosion of the mixture with vaporized methanol. Air may be used, instead of other mixtures of nitrogen with oxygen.

The proportions may be 3 to 15 % and preferably 5 to 7 % by volume of methanol in air; the mixture of methanol with air passes through the catalyst bed at a flow rate of 3,600 $h^{-1}$ to 72,000 $h^{-1}$, and preferably 24,000 $h^{-1}$ to 36,000 $h^{-1}$, when given in liters of gaseous mixture per liter of catalyst and per hour, under the normal conditions of temperature and pressure.

The following examples illustrate the invention without limiting the same in any respect.

EXAMPLE 1

A gel containing iron and molybdenum in the molecular ratio of $MoO_3$ to $Fe_2O_3$ ofof 4 is manufactured as follows: 2 800 ml of a solution of ammonium paramolybdate tetrahydrate 2 M/7 (353.2 g per liter) are introduced into a stirred reactor of 6,000 ml and cooled down to 8–10°C (solution A). 1,400 ml of a solution of ferric nitrate nonahydrate 2 M (808 g/liter) at 15–20°C are introduced into a funnel fit with a tap (solution B).

Solution B is added to the stirred solution A at an average flow rate of 2 500 ml. $liter^{-1}$. $hour^{-1}$, the stirrer being operated at 750 r.p.m. There is obtained a colloidal sand-yellow suspension at a temperature of 8–10°C. By slow reheating at moderate stirring (300 r.p.m.), it hardens at 14°C about 20 minutes after the end of the reactants introduction. An ageing of 2 hours at 30°C results in a dark green, homogeneous, transparent and crystallographically amorphous gel.

The latter is dried in an oven at 70°C for 48 hours and is converted to a new red-brown gel which contains 38–40 % by weight of ammonium nitrate and 1–2 % by weight of water. This gel also is transparent and crystallographically amorphous. The oven is then heated up to 170–180°C for 36 hours. The gel is converted to a new product of a sand-yellow colour with a loss of weight of 18–22 %. This product is withdrawn and crushed to a grain size lower than 250 microns. Twelve hundred g of the resulting powder are progressively moistened with 120 ml of water, thus forming an homogeneous paste which is aged for 2 hours at 20°C. The plastic material so obtained is extruded in an apparatus of the Andouart type so as to obtain cylinders of 3–5 mm diameter and average length.

These catalyst cylinders are progressively dried in an oven for 1 hour at 65°C, and then 30 minutes at 90–110–150°C and 2 hours at 180°C.

The resulting unactivated catalyst has an intense green green colour and contains about 17–19 % of ammonium nitrate and traces of water. A radiocrystallographic analysis of this unactivated catalyst has shown that it contained the crystalline phase $Fe_2(MoO_4)_3$; the other compounds do not appear on the diagram. This unactivated catalyst has an average mechanical crushing strength, grain by grain, of 30 kg.

The heat decomposition of the unactivated catalyst is carried out in fixed bed, in a light air stream, at a temperature of 400–430°C for 3 hours.

The resulting catalyst has an ash-green colour; its specific surface (B.E.T) is 4m$^2$.g$^{-1}$ and its total pore volume 26 ml/100 g. The radiocrystallographic analysis of the catalyst reveals the presence of the phases $Fe_2(MoO_4)_3$ and $MoO_3$, the latter being not very evident. The molecular composition of the catalyst is $Fe_2(MoO_4)_3$, $MoO_3$. Its average mechanical crushing strength is 6 kg (minimum: 4 kg; maximum: 10 kg) in the above conditions.

100 ml of the catalyst are introduced into a catalytic reactor and heated up to 350°C. A mixture of 6.7 % by volume of methanol in air is passed through the catalyst at an hourly flow rate (VVH) of 24,000 h$^{-1}$. The reaction temperature at 4 points of the catalyst bed is in the range of 371 to 384°C. After 24 hours, 99.8 % of the engaged methanol have been transformed with a selectivity to formaldehyde of 97.7 %. The yield of formaldehyde is 97.5 %.

EXAMPLE 2

The unactivated catalyst obtained in example 1 is directly charged into the reaction tube of the oxidation reactor. It is activated by heating for 2 hours at 350–400°C in an air stream. Methanol is introduced thereafter as a gas mixture of 6.7 % by volume of methanol in air, at the rate of 24,000 h$^{-1}$ (hourly volumes). The reaction temperature is in the range of 368 to 383°C. After 24 hours, 99.8 % of methanol have been transformed without change of selectivity to formaldehyde (97.7 %). The yield of formaldehyde is 97.5 %.

EXAMPLE 3

This example describes the manufacture of a gel containing iron, cobalt, molybdenum and tungsten.

353.2 g of ammonium paramolybdate tetrahydrate (2 moles $MoO_3$) are admixed with 56.4 g of ammonium metatungstate having a 92.05 % content of $WO_3$ (0.222 mole of $WO_3$), 526g of ferric nitrate nonahydrate (1.3 gr-ion $Fe^{3+}$) and 60.6 g of cobalt nitrate hexahydrate (0.208 gr-ion $Co^{2+}$). The pinkish yellow paste is malaxated for 15 minutes at 20°C in a Beken mixer with sigmoid blades of the BD-075 VH type, reheated up to 60°C and malaxated for 1 hour. The mixture is cooled down and results in a brown, transparent, crystallographically amorphous gel. This gel is dried for 24 hours at 65°C, and then 24 hours at 175°C. The resulting product, which contains 18–20 % of ammonium nitrate, is crushed and admixed with 50 ml of water. The resulting paste is extruded through a die fit with a rotating blade to cylinders of 3.5 × 3.5 mm. These cylinders are dried for 1 hour at 90°C, 1 hour at 150°C and 1 hour at 190°C. The unactivated catalyst of light brown colour, which contains 15–17% of ammonium nitrate, is thus obtained; its mechanical strength is more than 15 kg, when determined under the conditions above. The catalyst is activated by heating at 400°C for 3 hours in a slow air stream.

The resulting catalyst has the following molar composition: $MoO_3$ : 65.2%, $WO_3$ : 7.25%, $Fe_2O_3$ : 20.78%, CoO : 6.77%.

100 ml of this catalyst are tested in the oxidation of methanol to formaldehyde under the conditions of example 1. The reaction temperature is in the range of from 380 to 426°C. After 9 hours, 99.4% of methanol have been transformed with a selectivity to formaldehyde of 96%. The yield to formaldehyde is 95.4%.

EXAMPLE 4

A catalyst of the iron molybdate type has been obtained as follows: 200 grams of ammonium paramolybdate tetrahydrate (1.13 mole of $MoO_3$) are dissolved in 4 liters of water. The pH of the solution (solution A) is about 4.5 to 5 and the solution is heated up to 60°C.

164 g of ferric nitrate (0.405 gram-ion of $Fe^{3+}$) are dissolved separately in 2,200 ml of water, and the pH is adjusted to 1–1.5 : the resulting solution B is maintained at room temperature.

The solution B is slowly poured into the solution A under strong stirring. The precipitate is separated and the supernatant layer is syphoned off, then the precipitate is washed 3 times with 4 liters of water and filtered under 200 mmHg.

The resulting precipitate, which contains about 0.405 gram-ion of $Fe^{3+}$ in complex form, is admixed with 128 g of ammonium nitrate (1.60 mole) previously dissolved in 80 ml of water. A fluid paste is obtained and dried for 24 hours at 70°C and then for 36 hours at 175°C. The resulting product is broken to pieces, pulverized, admixed with 60 ml of water to obtain a homogeneous and plastic paste which is extruded in a machine of the Andouart type.

The extrudates of 3.5 × 3.5 mm are dried for 24 hours at 160°C. The resulting unactivated catalyst is characterized by a mechanical strength higher than 15 kg when determined with an Erweka machine.

50 ml of the unactivated catalyst are placed into the reaction tube of the oxidation reactor. The heat activation is carried out in an air stream for 2 hours at 350–400°C. Methanol is introduced thereafter, in the form of a gaseous mixture of 6.8% by volume of methanol in air, at an hourly rate of 24,000 h$^{-1}$ (VVH). The reaction temperature is varied from 310 to 380°C.

After 12 hours, 99% of methanol have been transformed with a selectivity to formaldehyde of 97%. The yield of formaldehyde is 96%.

EXAMPLE 5

Example 1 is repeated up to the crushing step. The product is heated for 36 hours at 170–180°C and crushed to obtain a grain size lower than 250 microns. 1,200 g of this product are admixed with 150 ml of water to obtain an homogeneous paste. 0.5% of methylcellulose and 0.5% of alginic acid (with respect to the dry weight of material) are added thereto. The paste is poured into a tank and diluted stepwise with 1,200 ml of water to obtain a paste containing 45–50% by weight of dry material.

This paste is dried by atomization in an atomizer RAMM having a capacity of 2 kg per hour. The hourly feed rate is 2.1 liters; the dispersion of the suspension is obtained by means of a double-fluid nozzle adapted after modification of the apparatus. The inlet and the outlet temperatures for the gas may be varied in the respective ranges of 260–269 and 138–148°C. The actual temperature at which the suspension is dried, although not measurable, is in this range.

980 g of unactivated catalyst, consisting of particles of an average size of 600 microns are thus obtained with a yield of about 95% by weight. These particles are introduced into a reactor of the fluid bed type. In a first step, the heat activation is carried out at an air rate of 25 liters (cold gas) per gram of catalyst and per hour. This air is progressively heated up to 350°C and maintained at this temperature for 2 hours. Then the feed charge, consisting of 6.7% by volume of methanol in air is passed therethrough at a rate of 20 liters (cold gas) per grain of catalyst and per hour. The average temperature of the catalyst suspension in the charge is varied from 250 to 330°C.

After 8 hours, 99.7% of methanol have been transformed and the selectivity to formaldehyde is 98%. The yield of formaldehyde is 97.7%.

What I claim is:

1. In a process for manufacturing a catalyst containing catalytic quantities of iron and molybdenum from a catalyst precursor, said iron and molybdenum being the predominant catalytic metallic elements in said catalyst and in said precursor, the improvement comprising:
   a. employing, as the said catalyst precursor, a homogeneous substance containing molybdate and ferric ions in an atomic ratio Mo/Fe of 1.5–5, water in an amount lower than 10% by weight, and ions of an ammonium salt in an amount expressed as the weight of said ammonium salt, of 10–50% of the dry weight of said homogeneous substance; and
   b. heating said homogeneous substance at 150–250°C for a time sufficient to eliminate substantially all the water and a portion of the ammonium salt contained therein, thereafter mixing the product resulting from said heating with water or a chemically inert solvent capable of dissolving not more than said ammonium salt, shaping said mixture, and heating resultant shaped mixture to 150–250°C to dry same and to result in an unactivated catalyst of improved mechanical strength, said unactivated catalyst being thereafter calcinable by heating at 300–500°C to result in an activated catalyst of improved mechanical strength.

2. A process as claimed in claim 1, wherein said homogeneous substance contains, as the ions of an ammonium salt, ammonium and nitrate ions.

3. A process as claimed in claim 1, wherein the heating step (b) is continued until the dry weight of loss of said homogeneous substance is 10–30% of its dry weight.

4. A process as claimed in claim 1, further comprising a step of grinding the product resulting from the heating step (b).

5. A process as claimed in claim 1, further comprising the step of calcining the unactivated catalyst at 300–500°C to form an activated catalyst.

6. An unactivated catalyst of improved mechanical strength as produced by the process of claim 1.

7. An activated catalyst of improved mechanical strength obtained by a process as claimed in claim 5.

8. A process as claimed in claim 1, wherein said homogeneous substance is a washed precipitate containing molybdate and ferric ions in an atomic ratio Mo/Fe of 1.5 to 4, to which an ammonium salt is added, by malaxating, in an amount corresponding to 0.3–2 moles per gm. equivalent of iron in said precipitate and the water content of which is reduced to less than 10% by weight.

9. A process as claimed in claim 8, wherein said ammonium salt is ammonium nitrate.

10. A process as claimed in claim 8, further comprising the step of calcining the unactivated catalyst at 300–500°C to form an activated catalyst.

11. In a process for manufacturing a catalyst containing catalytic quantities of iron and molybdenum from a catalyst precursor, said iron and molybdenum being the predominant catalytic metallic elements in said catalyst and in said precursor, the improvement comprising:
   a. employing, as the said catalyst precursor, a homogeneous, amorphous and transparent gel containing molybdate and ferric ions in an atomic ratio Mo/Fe of 1.5–5, water in an amount lower than 10% by weight, and ions of an ammonium salt in an amount expressed as the weight of said ammonium salt, of 30–50% of the dry weight of said homogeneous, amorphous and transparent gel; and
   b. heating said homogeneous, amorphous and transparent gel at 150–250°C for a time sufficient to eliminate substantially all the water and a portion of the ammonium salt contained therein, thereafter mixing the product resulting from said heating with water or a chemically inert solvent capable of dissolving not more than said ammonium salt, shaping said mixture, and heating resultant shaped mixture to 150–250°C to dry same and to result in an unactivated catalyst of improved mechanical strength, said unactivated catalyst being thereafter calcinable by heating at 300–500°C to result in an activated catalyst of improved mechanical strength.

12. A process as claimed in claim 11, wherein the heating step (b) is continued until the loss of dry weight of said homogeneous, amorphous and transparent gel is 10–30% of its dry weight.

13. A process as claimed in claim 11, wherein in said homogeneous, amorphous and transparent gel, up to 50% of the ferric ions is substituted with the ionic equivalent amount of cations of at least one metal selected from the group consisting of cobalt, nickel, manganese, chromium, scandium, yttrium, and the rare earth metals, and up to 50% of the molybdate ions is substituted with the ionic equivalent amount of oxygen-containing anions of at least one metal selected from the group consisting of chromium, tungsten, manganese, vanadium and uranium.

14. A process as claimed in claim 11, wherein said homogeneous, amorphous and transparent gel contains, as the ions of an ammonium salt, ammonium and nitrate ions.

15. A process as claimed in claim 11, further comprising a step of grinding the product resulting from the heating step (b).

16. A process as claimed in claim 11, said homogeneous, amorphous and transparent gel having been prepared by a process comprising reacting under stirring at a temperature lower than 20°C an aqueous solution of ammonium molybdate having a concentration of 1–2.5 gram-atoms of molybdenum per liter with an aqueous solution of ferric nitrate having a concentration higher than 1 gram-atom of iron per liter, the relative amounts of the solutions being such that, in their mixture, the atomic ratio Mo:Fe has the value from 1.5 to 5.

17. A process as claimed in claim 11, said homogeneous, amorphous and transparent gel having been prepared by a process comprising reacting by crushing at a temperature of at most 150°C solid ammonium molybdate and solid ferric nitrate, in the presence of an amount of water lower than the total of the amounts necessary to form individual saturated solutions of said ammonium molybdate and said ferric nitrate, the relative amounts of the solid reactants being such that, in their mixture, the atomic ratio Mo/Fe has the value from 1.5 to 5.

18. An unactivated catalyst of improved mechanical strength produced according to the process of claim 11.

19. A process as defined by claim 11, further comprising the step of calcining said unactivated catalyst at 300–500°C to form an activated catalyst.

20. An activated catalyst of improved mechanical strength produced according to the process of claim 19.

* * * * *